United States Patent
Seki

(10) Patent No.: US 8,254,341 B2
(45) Date of Patent: Aug. 28, 2012

(54) CONTROL CHANNEL TRANSMITTING METHOD, BASE STATION AND TERMINAL

(75) Inventor: Hiroyuki Seki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 405 days.

(21) Appl. No.: 12/625,759

(22) Filed: Nov. 25, 2009

(65) Prior Publication Data

US 2010/0074229 A1  Mar. 25, 2010

Related U.S. Application Data

(63) Continuation of application No. 11/812,789, filed on Jun. 21, 2007, which is a continuation of application No. PCT/JP2004/019626, filed on Dec. 28, 2004.

(51) Int. Cl.
*H04B 7/216* (2006.01)
(52) U.S. Cl. .................. 370/335; 370/437; 370/465
(58) Field of Classification Search .................. None
See application file for complete search history.

(56) References Cited

U.S. PATENT DOCUMENTS

| | | | |
|---|---|---|---|
| 5,761,240 A | | 6/1998 | Croucher, Jr. |
| 6,138,012 A | * | 10/2000 | Krutz et al. ............... 455/427 |
| 6,496,496 B1 | | 12/2002 | Ramakrishna et al. |
| 6,747,963 B1 | | 6/2004 | Park et al. |
| 7,372,836 B2 | | 5/2008 | Hwang et al. |
| 2002/0093913 A1 | | 7/2002 | Brown et al. |
| 2003/0186698 A1 | * | 10/2003 | Holma et al. ............... 455/436 |
| 2004/0082356 A1 | * | 4/2004 | Walton et al. ............... 455/522 |
| 2004/0160933 A1 | * | 8/2004 | Odenwalder et al. ......... 370/342 |
| 2005/0120097 A1 | * | 6/2005 | Walton et al. ............... 709/220 |

FOREIGN PATENT DOCUMENTS

| | | |
|---|---|---|
| CN | 1347604 | 5/2002 |
| CN | 1906892 | 11/2004 |
| EP | 0966125 | 12/1999 |
| EP | 1517456 | 3/2005 |
| JP | 11-355860 | 12/1999 |
| JP | 2002-369258 | 12/2002 |
| JP | 2003-304195 | 10/2003 |
| KR | 2002-0079453 | 10/2002 |
| WO | 2004/002018 | 12/2003 |
| WO | 2004/039011 | 5/2004 |

OTHER PUBLICATIONS

Patent Office of South Korea, Notification to Submit Argument, dated Jul. 30, 2008 for corresponding Korean Patent Application No. 10-2007-7014631.

Japanese Patent Office, Office Action with English Translation of Office Action for corresponding Japanese Patent Application No. 2006-550533, with a mailing date of Aug. 25, 2009.

(Continued)

*Primary Examiner* — Gregory Sefcheck
*Assistant Examiner* — Salvador E Rivas
(74) *Attorney, Agent, or Firm* — Myers Wolin, LLC

(57) ABSTRACT

A control channel transmitting method includes selecting one control channel format from among a plurality of control channel formats having different numbers of control points, according to whether to carry out multiple input multiple output transmission; and transmitting a control channel with the use of the selected control channel format.

10 Claims, 9 Drawing Sheets

OTHER PUBLICATIONS

TS 25.211 V2.1.0 (Jun. 1999); 3rd Generation Partnership Project (3GPP); Technical Specification Group (TSG) Radio Access Network (RAN); Working Group 1 (WG1); Physical channels and mapping of transport channels onto physical channels (FDD); dated Jun. 1999; pp. 13-24; [Ref.: Japanese Patent Office Office Action mailed Aug. 25, 2009].

3GPP TS 25.212 V5.9.0; "Third Generation Partnership Project Technical Specification Group Radio Access Network; "Multiplexing and channel coding (FDD); (Release 5); dated Jun. 2004.

3GPP TS 25.211 V5.6.0; 3rd Generation Partnership Project; Technical Specification Group Radio Access Network; "Physical channels and mapping of transport channels onto physical channels (FDD)"; (Release 5); dated Sep. 2004.

Official Office Action issued by The Patent Office of the People's Republic of China for corresponding Chinese Application No. 200480044771.5 dated Nov. 9, 2011.

Japanese Patent Office "Final Office Action", for corresponding Japanese Patent Application No. 2006-550533, with a mail date of Feb. 2, 2010, with English translation attached.

Mitsubishi ITE/Motorola Labs; IEEE P802.11-0410914r1; "Wireless LANs"; Response to Call for Proposal For P802.11n; Rennes, France; Abstract and pp. 10-11; Dated Sep. 2004.

State Intellectual Property Office of the People's Republic of China "First Office Action" for corresponding Chinese Patent Application No. 200480044771.5, issued Jan. 8, 2010. English translation attached.

Japanese Patent Office "Office Action" for corresponding Japanese Patent Application No. 2006-550533, mailed Jun. 1, 2010. English translation attached.

Norihiko Morinaga et al; "A Study on MIMO/AMS Employed Turbo Trellis Coded Modulation"; The Institute of Electronics, Information and Communication Engineers; Technical Report of IEICE; A-P2003-201; Nov. 14, 2003, vol. 103 No. 460, pp. 121-126, RCS2003-207; English Abstract. [Ref.: JPO Office Action mailed Jun. 1, 2010].

QUALCOMM, Incorporated; "System Description and Operating Principles for High Throughput Enhancements to 802.11"; IEEE P802.11, Wireless LANs; QUALCOMM, Incorporated, 9 Damonmill Square, Suite 2A Concord, MA 01742; Aug. 13, 2004; [Ref.: JPO Office Action mailed Jun. 1, 2010].

Japanese Patent Office "Office Action" issued for corresponding Japanese Patent Application No. 2009-245881, mailed Aug. 16, 2011. Partial English translation attached.

Supplementary European search report issued for corresponding European Patent Application No. 04807981.8 dated Jan. 19, 2012.

\* cited by examiner

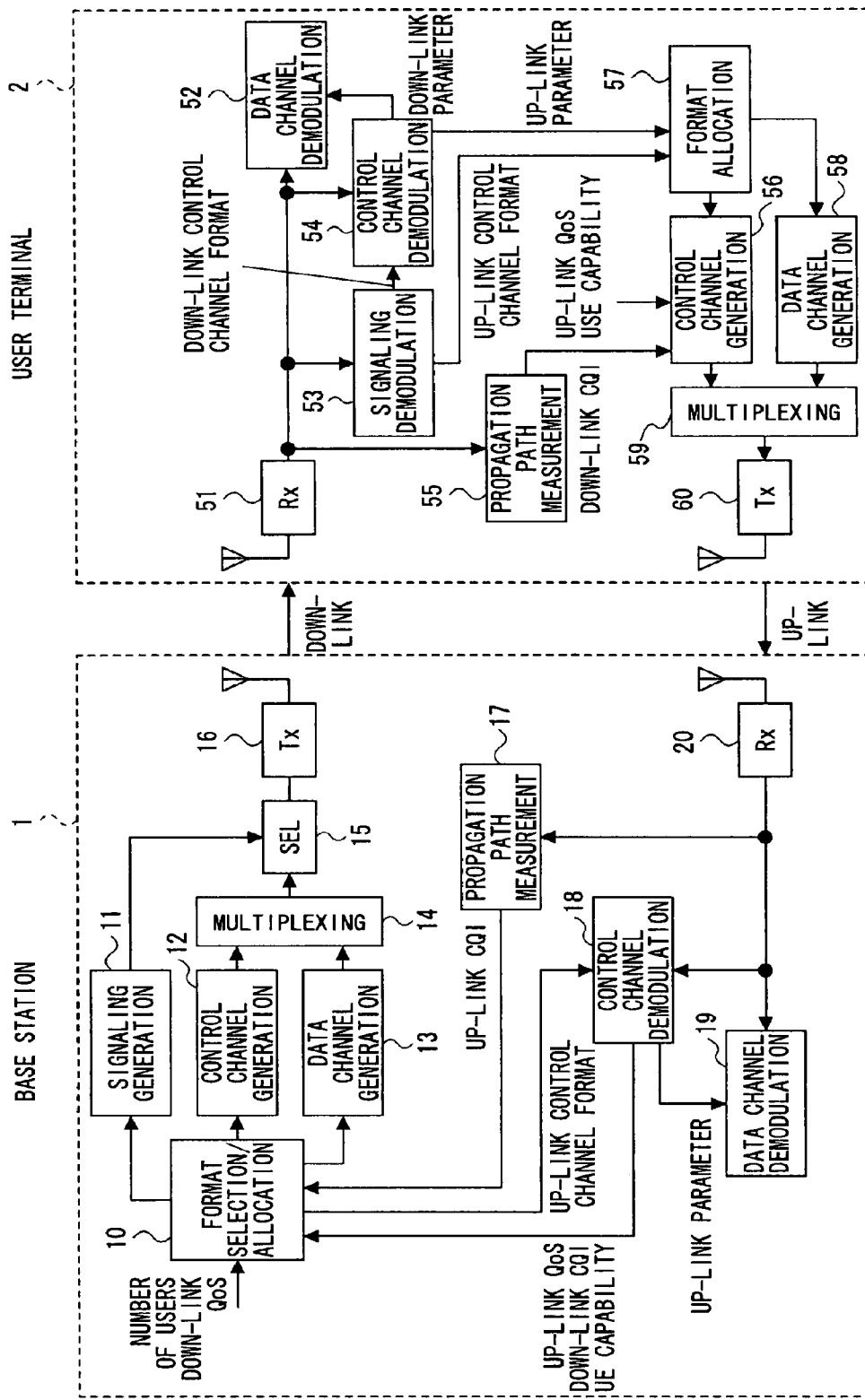

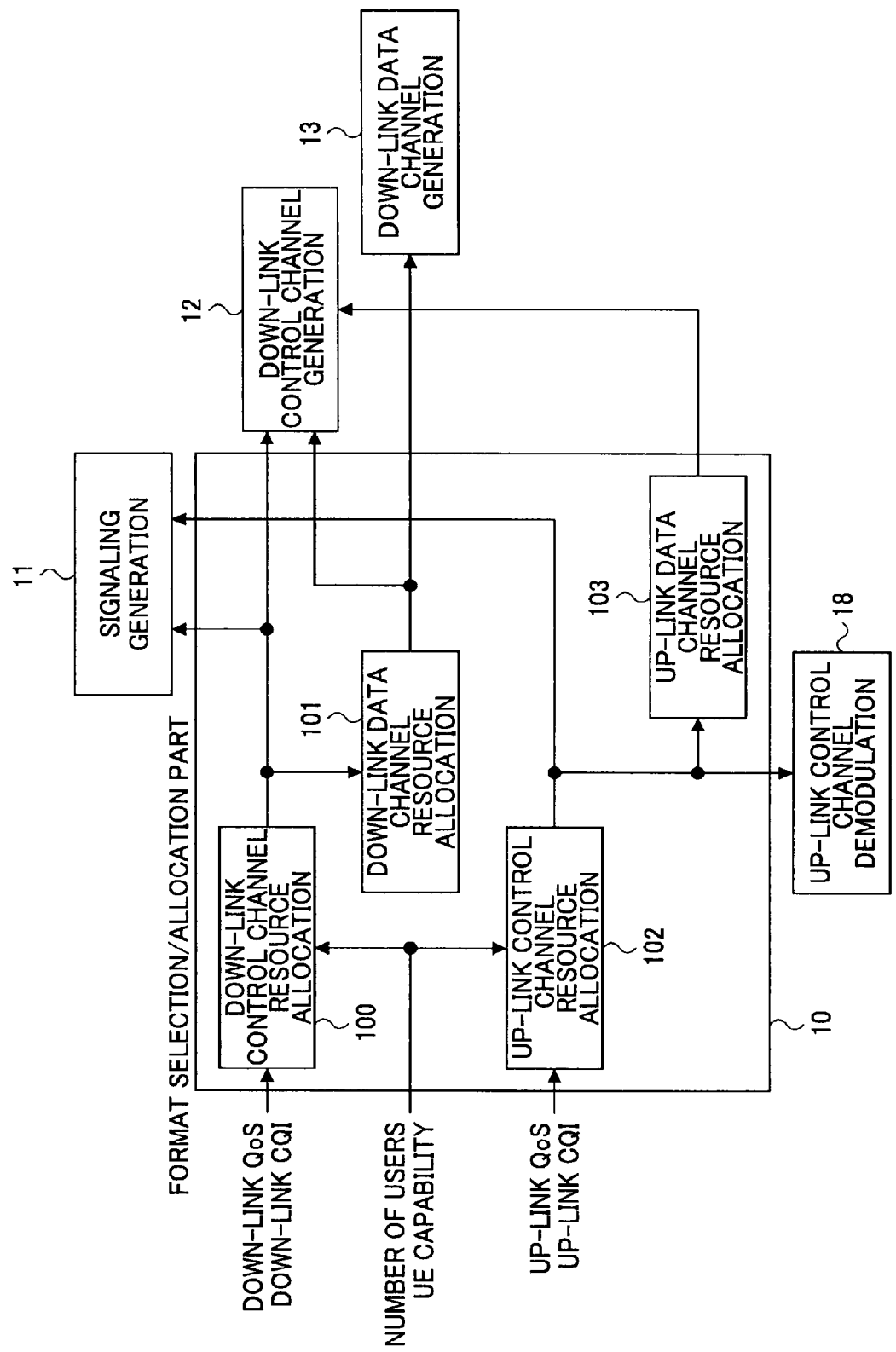

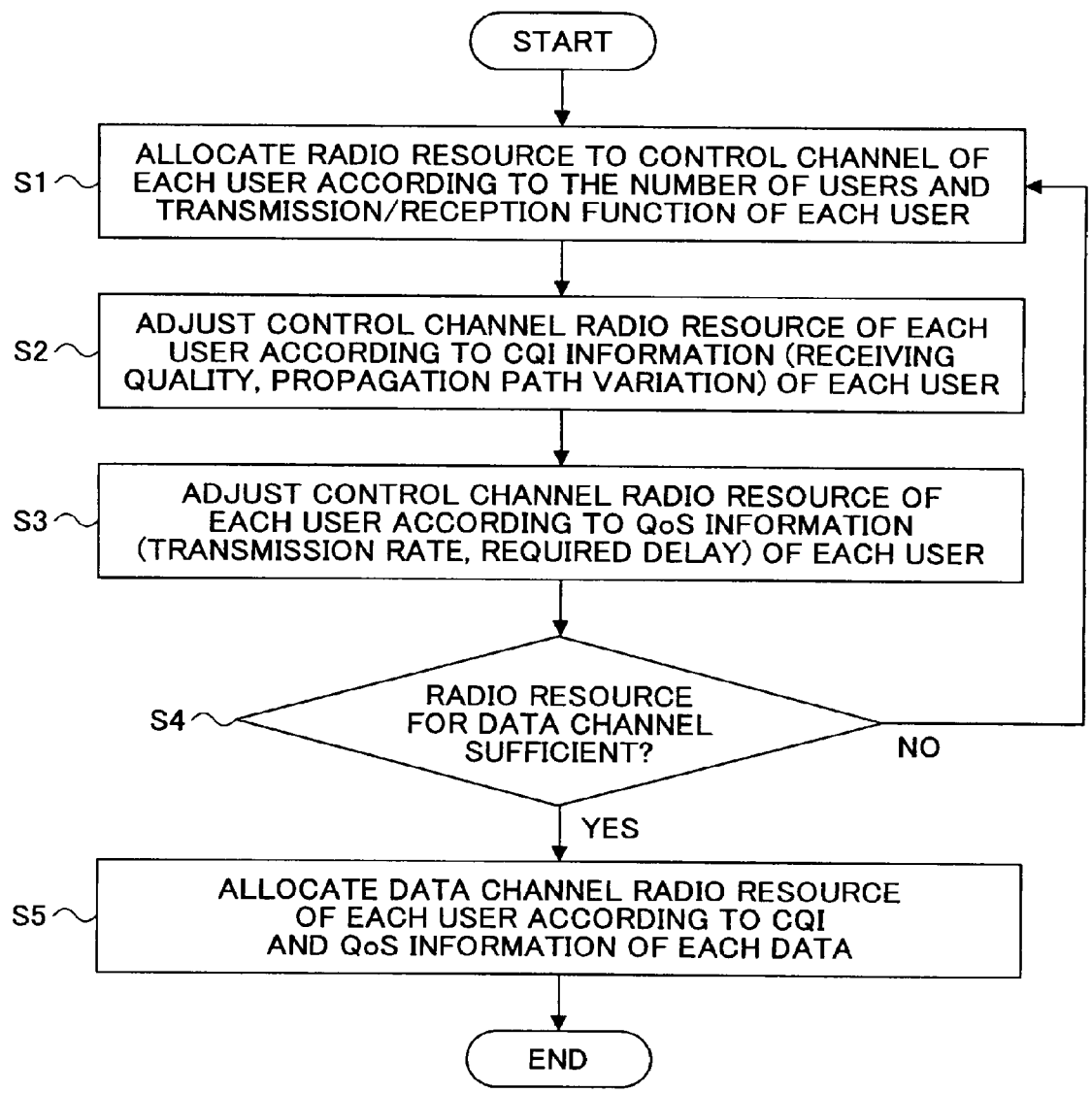

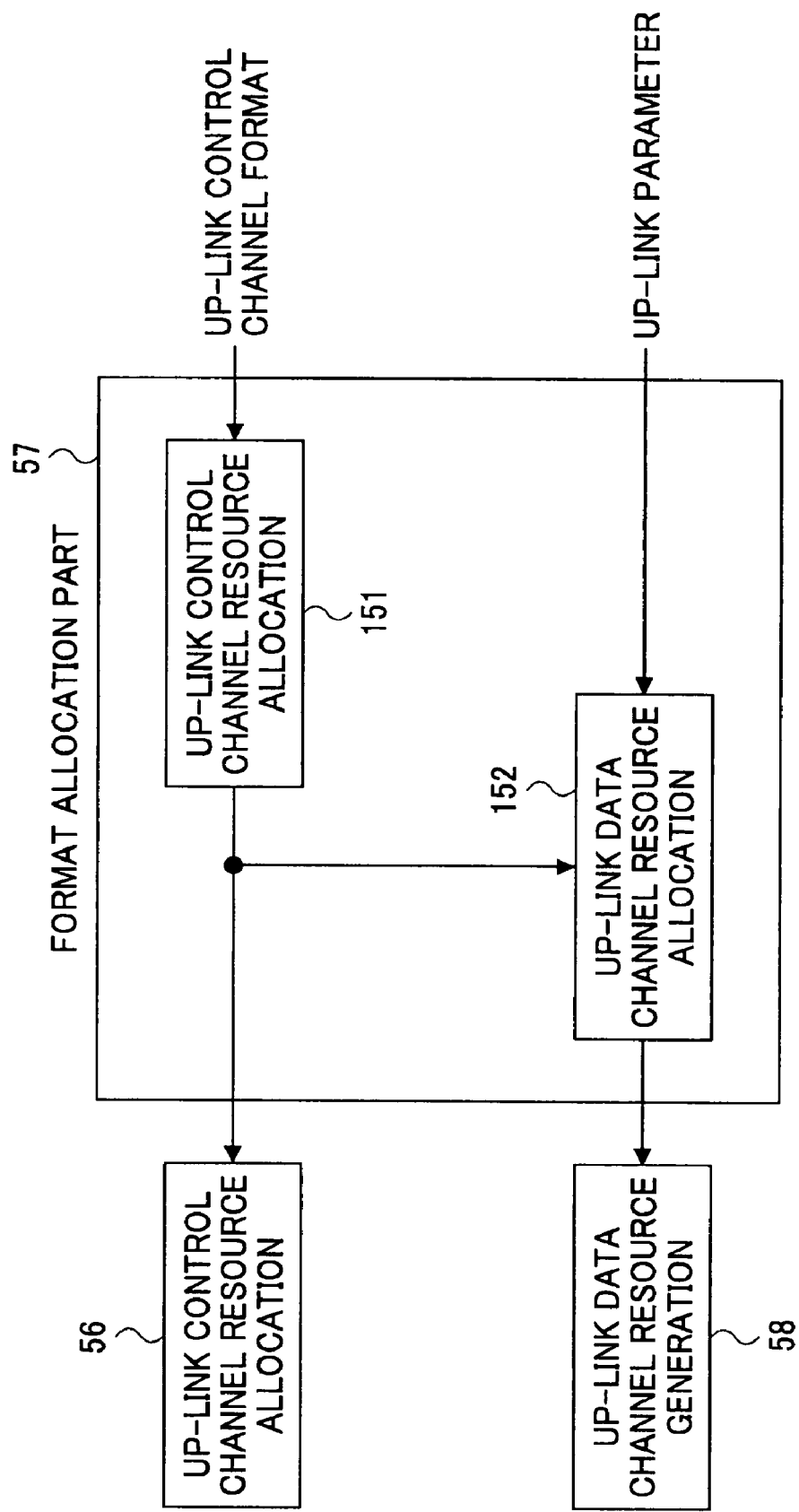

CONTROL CHANNEL TRANSMITTING METHOD, BASE STATION AND TERMINAL

CROSS-REFERENCE TO RELATED APPLICATION

The present application is a continuation of U.S. application Ser. No. 11/812,789, filed on Jun. 21, 2007, now pending, which is a continuation of International Patent Application No. PCT/JP04/019626, filed Dec. 28, 2004, the contents of each are herein wholly incorporated by reference.

BACKGROUND OF THE INVENTION

1. Field of the Invention

The present invention relates to a control channel transmitting method, a base station and a terminal, in particular, to a control channel transmitting method, a base station and a terminal for adaptively controlling a communication parameter with the use of a control channel.

2. Description of the Related Art

For example, in a communication system in the third generation, adaptive radio link control such as adaptive modulation/demodulation, HARQ (Hybrid Automatic Repeat request), scheduling or such is used, for the purpose of improving data packet transmission efficiency. The adaptive radio link control is carried out with the use of a separate or a shared control channel, and, a link parameter which is used in a data channel transmitted approximately simultaneously with the control channel, is notified of to each user terminal.

For example, in a case of the adaptive modulation/demodulation, the control channel transmits information such as a data channel modulating method, an encoding rate and so forth. In a case of the HARQ, the control channel transmits information such as packet numbers of packets transmitted via a data channel, the number of times of re-transmission and so forth. In a case of the scheduling, the control channel transmits information such as a user ID.

In HSPDA (High Speed Downlink Packet Access) standardized by 3GPP (Third Generation Partnership Project), the shared control channel called HS-SCCH (Shared Control Channel for HS-DSCH) is used, and control information such as that shown in Table 1, is transmitted, as disclosed by a non-patent document 1.

TABLE 1

| HS-SCCH physical channel | |
|---|---|
| Channelization-code-set information | 7 bits |
| Modulation scheme information | 1 bit |
| Transport-block size information | 6 bits |
| Hybrid-ARQ process information | 3 bits |
| Redundancy and constellation version | 3 bits |
| New data indicator | 1 bit |
| Ue identity | 16 bits |

In a control channel transmitting method in the prior art used in the adaptive radio link control, in order to positively demodulate the control channel transmitting information required for data channel demodulation on a reception side, a fixed control channel format is used. Further, in order to avoid degradation in data channel transmission efficiency, an information amount is reduced to be bare minimum in the control channel transmitting method in the prior art, the control channel format to be used is fixed, and thus, a variable control channel format is not used.

As disclosed in a non-patent document 2, HSDPA control information shown in Table 1 undergoes rate matching to be totally 120 bits, after undergoing CRC attaching and convolution encoding of R=1/3. Then, QPSK modulation and spreading of SF=128 are carried out, and mapping is carried out in a physical channel of HS-SCCH.

Non-patent document 1: 3GPP TS 25.212 v5.9.0 (2004-06)
Non-patent document 2: 3GPP TS 25.211 v5.6.0 (2004-09)

In a next generation communications system, in order to achieve high-speed data transmission, MIMO (Multiple Input Multiple Output) transmission with the use of multi-carrier transmission or a plurality of antennas is used. In this case, it is possible to further improve transmission characteristics by carrying out adaptive control of a radio parameter for each sub-carrier or for each transmission antenna.

However, MIMO transmission has such a problem that the number of variable parameters increases, and the number of bits required for the control channel increases. Further, also for a case where the number of simultaneously multiplexing users via one frame increases, required information of the control channel increases in proportion to the number of users.

On one hand, the upper limit of a channel capacity simultaneously transmittable is defined by the number of channels which can be multiplexed orthogonally. Accordingly, when the information amount of the control channel increases, the number of data channels available for data transmission decreases, and as a result, the data transmission efficiency degrades.

Description will now be made with a case of user multiplexing by means of CDMA (Code Division Multiple Access) for example. FIG. 1 illustrates the number of codes available for data channels when the number of simultaneously multiplexing users is 1. FIG. 1 shows an example in which the number of simultaneously multiplexing users is 1, and, code multiplexing transmission of spreading of SF=8 is carried out for each of both the data channels and the control channels. When the number of codes required for transmitting the control channels is 1, the number of codes available for the data channels is 7 as all the remaining code resources which can be orthogonalized are used for the data channels.

FIG. 2 illustrates the number of codes available for data channels when the number of simultaneously multiplexing users is 4. When the number of simultaneously multiplexing users is 4 as in FIG. 2, 4 codes are used for the control channel, and thus, the number of codes available for the data channels is limited to 4. Accordingly, the data channel transmission efficiency per frame degrades in 4/7.

When the information amount of the control channel is reduced to be bare minimum in order to avoid degradation in the data channel transmission efficiency, a benefit of the adaptive radio link control may not be obtained, and thus, the transmission characteristics of the entire system may not be improved.

For example, in wide band multi-carrier transmission, communication quality differs for each sub-carrier due to frequency selective fading, and thus, it is possible to improve total throughput by carrying out communications with always selecting a sub-carrier having good communication quality.

Further, the same in MIMO transmission, when independent fading for each antenna branch occurs, it is possible to improve total throughput by always selecting a transmission antenna having good communication quality, or carrying out adaptive modulation/demodulation for each antenna. Thus, in the control channel transmitting method used for adaptive radio link control, total throughput should be improved without degradation in data channel transmission efficiency.

SUMMARY OF THE INVENTION

The present invention has been devised in consideration of this point, and an object of the present invention is to provide a control channel transmitting method, a base station and a terminal by which total throughput can be improved without degradation in data channel transmission efficiency.

In order to solve the above-mentioned problem, a control channel transmitting method according to the present invention has a step of selecting one control channel format from among a plurality of control channel formats having different information amounts according to a predetermined condition and a step of transmitting a control channel with the use of the thus-selected control channel format.

Further, a base station according to the present invention has format selecting means for selecting a control channel format from among a plurality of control channel formats having different information amounts according to a predetermined condition and transmitting means for transmitting a control channel to a terminal with the use of the thus-selected control channel format.

Further, a terminal according to the present invention has control channel demodulating means for having a control channel format notified of from a base station which transmits a control channel with the use of the control channel format which is selected from among a plurality of control channel formats having different information amounts according to a predetermined condition, and demodulating the control channel thus received from the base station with the use of the thus-notified control channel format, and data channel demodulating means for demodulating a data channel received from the base station with the use of a result of the demodulation of the control channel thus carried out by the control channel demodulating means.

According to the present invention, one control channel format is selected from among a plurality of control channel formats having different information amounts according to a predetermined condition and a control channel is transmitted with the use of the thus-selected control channel format.

The predetermined condition may include the number of multiplexing users in one transmission frame, a transmission/reception function mounted in a user terminal, QoS of a data channel, propagation path quality or such. By selecting one control channel format according to the predetermined condition, it is possible to limit an information amount of the control channel, thus reduce the information amount of the control channel, and thus, it is possible to avoid degradation in data channel transmission efficiency.

According to the present invention, it is possible to provide a control channel transmitting method, a base station and a terminal for improving total throughput without degradation in data channel transmission efficiency.

BRIEF DESCRIPTION OF DRAWINGS

Other objects and further features of the present invention will become more apparent from the following detailed description when read in conjunction with the accompanying drawings:

FIG. 6 shows a configuration of one embodiment of a system achieving a control channel transmitting method according to the present invention.

FIG. 7 shows a configuration of one embodiment of a format selection/allocation part.

FIG. 8 shows a flow chart of one example of a processing procedure of the format selection/allocation part.

FIG. 9 shows a configuration of one embodiment of a format allocation part.

Figure 1:
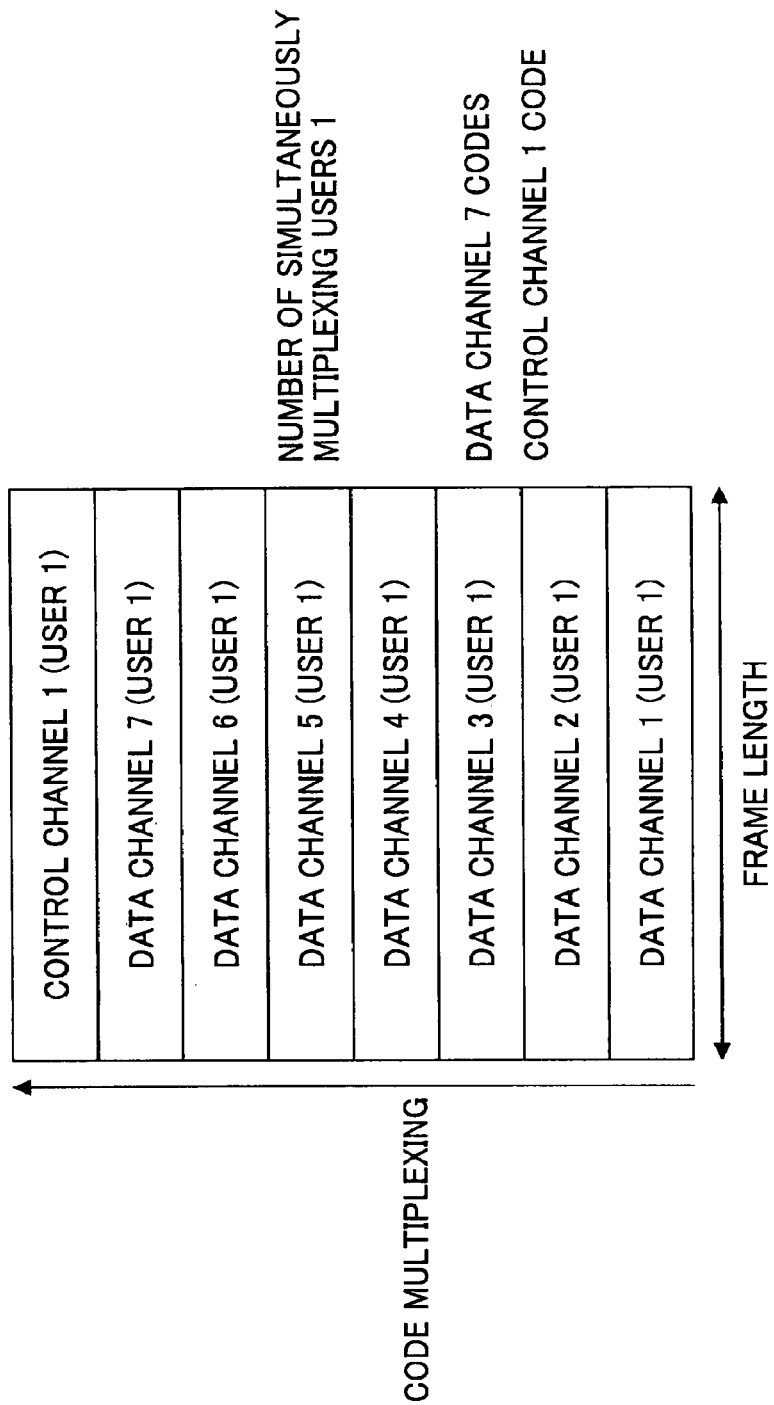
FIG. 1 illustrates the number of codes available for data channels when the number of simultaneously multiplexing users is 1.

DESCRIPTION OF REFERENCE NUMERALS 1 base station
2 user terminal
10 format selection/allocation part
11 signaling generation part
12 control channel generation part
13 data channel generation part
14 multiplexing part
15 selection part
16 transmission part
17 propagation path measurement part
18 control channel demodulation part
19 data channel demodulation part
20 reception part
51 reception part
52 data channel demodulation part
53 signaling demodulation part
54 control channel demodulation part
55 propagation path measurement part
56 control channel generation part
57 format allocation part
58 data channel generation part
59 multiplexing part
60 transmission part
100 down-link control channel resource allocation part
101 down-link data channel resource allocation part
102 up-link control channel resource allocation part
103 up-link data channel resource allocation part
151 up-link control channel resource allocation part
152 up-link data channel resource allocation part

DETAILED DESCRIPTION OF THE PREFERRED EMBODIMENTS

First, for easy understanding of the present invention, a principle of the present invention will now be described. According to the present invention, a plurality of control channel formats having different information amounts, one thereof is selected according to a predetermined condition, for example, a situation (the number of simultaneously multiplexing users, a transmission/reception function (UE capability) of a user terminal, QoS, propagation path quality or such), and then, the selected control channel format is used.

Here, an example in which two types of control channel formats, such as those shown in Table 2 and Table 3, are prepared, will now be described.

TABLE 2

CONTROL CHANNEL FORMAT A

| CONTENTS | NUMBER OF BITS | VARIABLE RANGE |
|---|---|---|
| MODULATING METHOD (ANTENNA 1) | 2 | 4 TYPES (QPSK, 8PSK, 16QAM, 64QAM) |
| MODULATING METHOD (ANTENNA 2) | 2 | 4 TYPES (QPSK, 8PSK, 16QAM, 64QAM) |
| MODULATING METHOD (ANTENNA 3) | 2 | 4 TYPES (QPSK, 8PSK, 16QAM, 64QAM) |
| MODULATING METHOD (ANTENNA 4) | 2 | 4 TYPES (QPSK, 8PSK, 16QAM, 64QAM) |
| ENCODING RATE | 2 | 4 TYPES (1/3, 1/2, 2/3, 3/4) |
| SPREADING FACTOR | 3 | 8 TYPES (1, 2, 4, 8, 16, 32, 64, 128) |
| CODE SET | 128 | MAXIMUM 128 CODES |
| TOTAL | 141 | |

TABLE 3

CONTROL CHANNEL FORMAT B

| CONTENTS | NUMBER OF BITS | VARIABLE RANGE |
|---|---|---|
| MODULATING METHOD (COMMON TO ANTENNAS) | 1 | 2 TYPES (QPSK, 16QAM) |
| ENCODING RATE | 1 | 2 TYPES (1/2, 3/4) |
| SPREADING FACTOR | 2 | 4 TYPES (1, 4, 16, 64) |
| CODE SET | 64 | MAXIMUM 64 CODES |
| TOTAL | 68 | |

A control channel format A shown in Table 2 has, as adaptive control parameters, a modulating method (antenna 1) through a modulating method (antenna 4), an encoding rate, a spreading factor and a code set. For example, for the modulating method (antenna 1) through the modulating method (antenna 4), four types of modulating methods (QPSK, 8PSK, 16QAM, 64QAM) are set as variable ranges. The control channel format A shown in Table 2 is such that the number of types and the variable ranges of the adaptive control parameters are wide, and thus, the modulating method can be made variable for each antenna upon MIMO transmission, for example.

On one hand, a control channel format B shown in Table 3 has, as adaptive control parameters, a modulating method (common for antennas), an encoding rate, a spreading factor and a code set. For example, the modulating method (common for antennas) is such that two types of modulating methods (QPSK and 16QAM) are set as a variable range. The control channel format B shown in Table 3 is such that the types and the variable range of the adaptive control parameters are limited in comparison to those of the control channel format A, and the number of bits is approximately ½ of that of the control channel format A.

It is also possible to use the control channel format B for a user terminal compliant to MIMO transmission, when such a condition that a modulating method is not variable for each antenna, and the modulating method is controlled in common to the antennas are allowed.

According to the present invention, when the number of simultaneously multiplexing users is small, the control channel format A having the large information amount is used, and thus, a larger benefit of the adaptive radio link control can be obtained, whereby total throughput can be improved.

On one hand, according to the present invention, when the number of simultaneously multiplexing users is large, the control channel format B having the smaller information amount is used, and thus, the information amount of the control channel is limited. Then, the information amount of data channels is increased by an amount by which the information amount of the control channel is thus reduced, and thus, it is possible to avoid degradation in data channel transmission efficiency.

Figure 3:
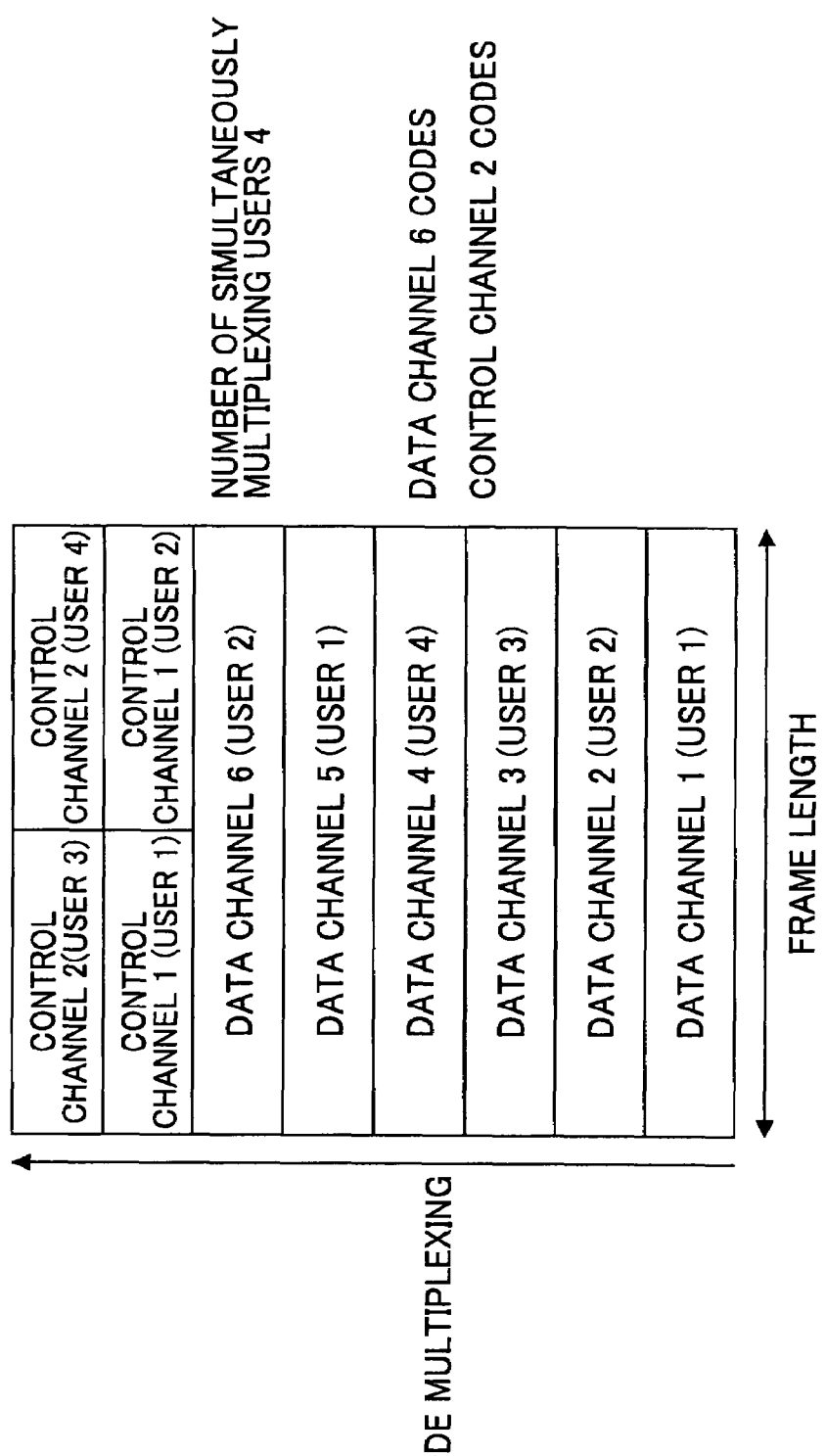
FIG. 3 illustrates one example of the number of codes available for data channels when the number of simultaneously multiplexing users is 4.

Description will now be made assuming a case of user multiplexing by means of CDMA. FIG. 3 illustrates one example showing the number of codes available for data channels when the number of simultaneously multiplexing users is 4.

In FIG. 3, the control channel format B having the information amount approximately ½ of that of the control channel format A is used, and thus, two control channels (for two users) are multiplexed in one spreading code.

As a method of dividing in one spreading code, a method of using time slots along a time direction or another method of using sub-carriers along a frequency direction is available. It is noted that, FIG. 3 shows the example in which time slots along a time direction are used, and thus, the two control channels are multiplexed in a time domain in one spreading code.

Figure 2:
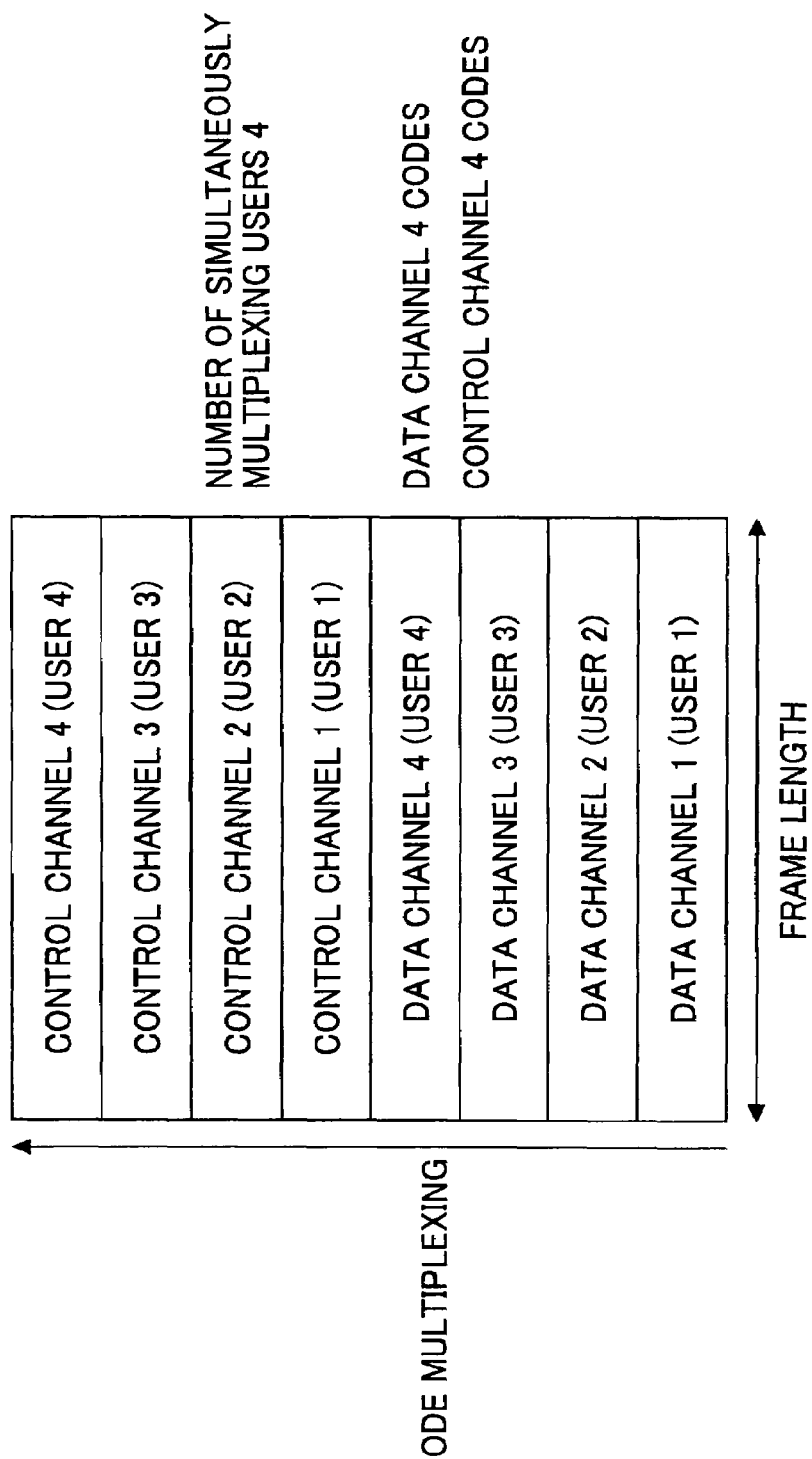
FIG. 2 illustrates the number of codes available for data channels when the number of simultaneously multiplexing users is 4.

In the example of FIG. 3, as the number of codes necessary for transmitting the control channels for four users is 2, the number of codes available for data channels increases to 6. Accordingly, in the example of FIG. 3, in comparison to the example of FIG. 2 described above, the data channel transmission efficiency improves.

Further, other than the methods of multiplexing control channels in a time domain or a frequency domain, the number of multiplexing may be increased in a code domain by increasing a spreading factor of the control channels.

Figure 4:
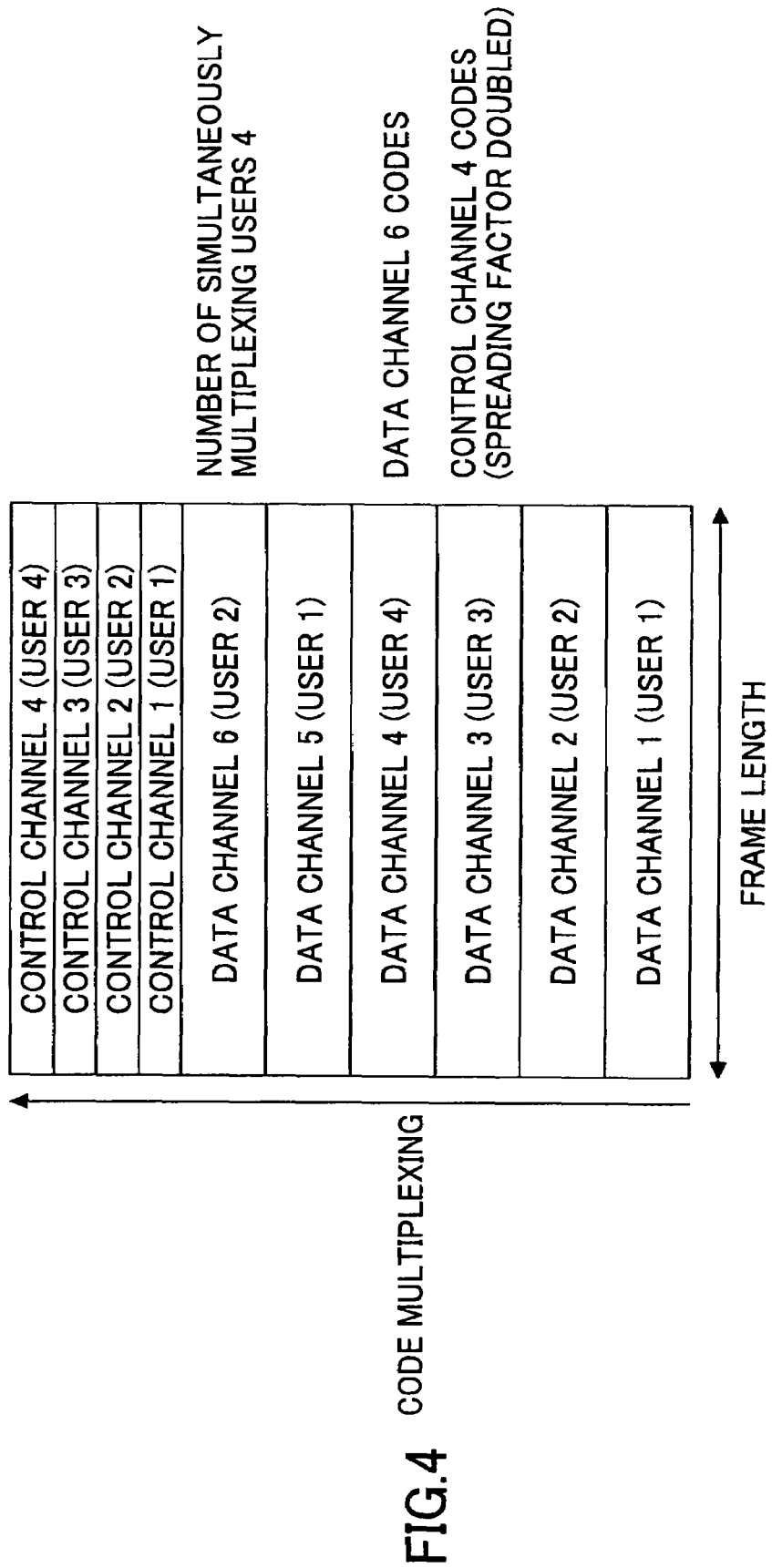
FIG. 4 illustrates another example of the number of codes available for data channels when the number of simultaneously multiplexing users is 4.

FIG. 4 illustrates another example showing the number of codes available for data channels when the number of simultaneously multiplexing users is 4. In FIG. 4, the spreading factor of the control channels is doubled, and the control channel format B having the information amount approximately ½ of that of the control channel format A is used. Thereby, the number of codes available for data channels increases to 6. Accordingly, in the example of FIG. 4, in comparison to the case of FIG. 2, the data channel transmission efficiency improves.

Figure 5:
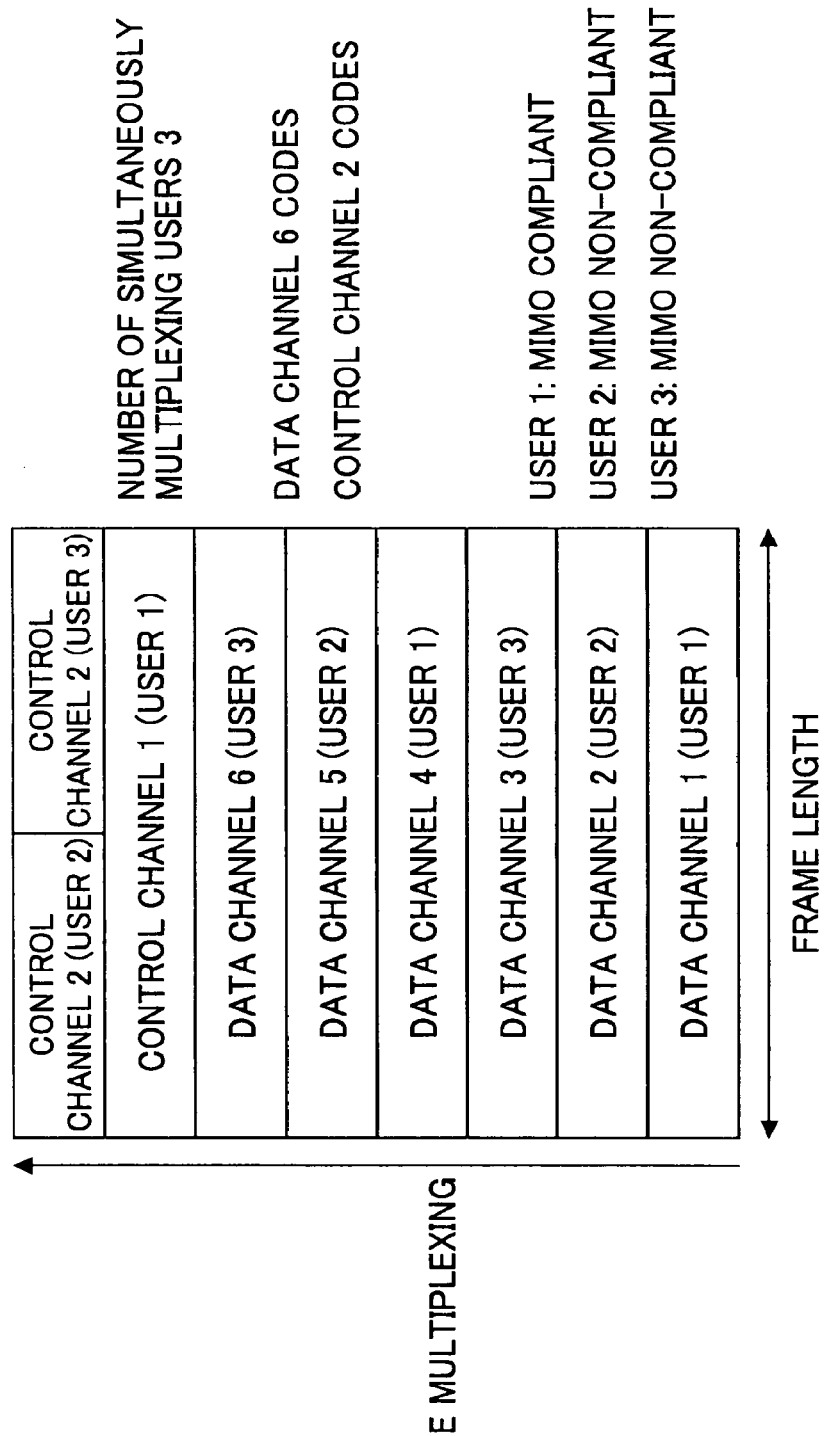
FIG. 5 illustrates another example of the number of codes available for data channels when the number of simultaneously multiplexing users is 3.

Further, the control channel format may be switched according to whether or not a user terminal is compliant to MIMO transmission. FIG. 5 shows another example showing the number of codes available for data channels when the number of simultaneously multiplexing users is 3.

In FIG. 5, the example is shown in which one user terminal compliant to MIMO transmission and other two user terminals not compliant to MIMO transmission are mixed. In this case, the control channel format A is allocated to the user terminal compliant to MIMO transmission, while, the control channel format B is allocated to the user terminals not compliant to MIMO transmission.

As a result of the control channel format B being allocated to the user terminals not compliant to MIMO transmission, two control channels (for two users) are multiplexed in one spreading code. As a result of the control channel format A being allocated to the user terminal compliant to MIMO transmission, one control channel (for a single user) is multiplexed in one spreading code.

Thus, for the user terminals not compliant to MIMO transmission, code resources used for the control channels is limited, and thus, data channel efficiency can be improved. For the user terminal compliant to MIMO transmission, adaptive radio link control is available for each antenna, and thus, total throughput can be improved. Accordingly, in the example of FIG. 5, transmission efficiency of data channels improves in comparison to the case of FIG. 2.

It is noted that the control channels shown in FIGS. 3 through 5 may be combined together appropriately. For example, in FIG. 5, the example is shown in which the two control channel formats B are multiplexed in the signal spreading code in the time domain. However, they may be multiplexed in a code domain as shown in FIG. 4, where the spreading factor of the control channels is doubled.

Further, changing of the control channel format to use according to QoS or propagation path quality different for each user is advantageous. For example, for a user terminal having low propagation path quality, and a propagation path condition fluctuates violently, the control channel format A having the wider variable range of the adaptive radio link control should be used.

Further, for a user terminal having good propagation path quality and a relatively stable propagation path condition, the control channel format B requiring the smaller information amount should be used. Further, for a user terminal requiring high QoS, i.e., requiring a high data transmission rate, or a reduced transmission delay, the control channel format A having the wider variable range of the adaptive radio link control, from which improvement in throughput is thus expected, should be used.

Thus, according to the present invention, such control is carried out that, the control channel format to use is selected according to a situation, and thus, transmission efficiency (total throughput) is maximized.

The control is made mainly by a base station. The base station selects the control channel format, and notifies a user terminal of the thus-selected control channel format by means of signaling. The singling should be made at a time of connection to the user terminal, or every predetermined time interval.

Further, in the signaling, not only the thus-selected control channel format, but also a spreading factor and/or a spreading code of the control channel, a time slot (for when multiplexing is made in a time domain), a sub-carrier arrangement (for when multiplexing is made in a frequency domain), or such, are notified of, simultaneously. It is noted that the present invention is applicable not only to down-link transmission from the base station to the user terminal but also to up-link transmission from the user terminal to the base station in the same manner.

Next, a best mode for carrying out the present invention will now be described based on an embodiment with reference to figures. FIG. 6 shows a configuration of one embodiment of a system achieving a control channel transmitting method according to the present invention. The system of FIG. 6 includes a base station 1 and a user terminal 2.

The base station 1 is configured to include a format selection/allocation part 10, a signaling generation part 11, a control channel generation part 12, a data channel generation part 13, a multiplexing part 14, a selection part 15, a transmission part 16, a propagation path measurement part 17, a control channel demodulation part 18, a data channel demodulation part 19 and a reception part 20.

The user terminal 2 is configured to include a reception part 51, a data channel demodulation part 52, a signaling demodulation part 53, a control channel demodulation part 54, a propagation path measurement part 55, a control channel generation part 56, a format allocation part 57, a data channel generation part 58, a multiplexing part 59 and a transmission part 60.

First, a down-link control channel transmitting method from the base station 1 to the user terminal 2 will now be described. The format selection/allocation part 10 of the base station 1 selects a control channel format as described above, and determines allocation of control channels and data channels in a frame (multiplexing method). The number of users to be multiplexed, information such as a transmission/reception function of the user terminals, down-link QoS, down-link CQI (Channel Quality Indicator) or such, is used for the control channel format selection.

Format allocation information indicating the selected allocation of the control channel format is notified of to the user terminal 2 as signaling information from the signaling generation part 11 via the selection part 15 and the transmission part 16. Further, the format allocation information is notified of to the control channel generation part 12 and the data channel generation part 13.

A control channel and data channels generated by the control channel generation part 12 and the data channel generation part 13 are multiplexed by the multiplexing part 14 based on the format allocation information, and then, are transmitted to the user terminal 2 via the transmission part 16.

Next, the signaling demodulation part 53 of the user terminal 2 demodulates the signaling information (format allocation information) notified of from the base station 1 via the reception part 51, and notifies the control channel demodulation part 54 of the down-link control channel format. Based on the down-link control channel format notified of from the signaling demodulation part 53, the control channel demodulation part 54 demodulates the control channel. The control channel demodulation part 54 notifies the data channel demodulation part 52 of down-link adaptive control parameters demodulated from the control channel.

The data channel demodulation part 52 uses the adaptive control parameters notified of from the control channel demodulation part 54, and carries out demodulation of the data channels. Down-link CQI used for selecting the down-link control channel format is measured by the propagation path measurement part 55 of the user terminal 2. Then, the down-link CQI, together with up-link QoS, a transmission/reception function of the user terminal 2, is transmitted to the base station 1 by means of an up-link control channel for the base station 1 from the user terminal 2.

Next, an up-link control channel transmitting method from the user terminal 2 to the base station 1 will now be described. The up-link control channel format is selected by the format selection/allocation part 10 of the base station 1, the same as the down-link control channel format. The number of users multiplexed, the transmission/reception function of the user terminal, the up-link QoS, the up-link CQI (Channel Quality Indicator) or such, is used for selecting the up-link control channel format.

The selected up-link control channel format is notified of to the user terminal 2 as signaling information, from the signaling generation part 11, via the selection part 15 and the transmission part 16. The signaling demodulation part 53 demodulates the signaling information notified of from the base station 1 via the reception part 51, and notifies the format allocation part 57 of the up-link control channel format. The format allocation part 57 determines allocation of the up-link control channel and data channels (multiplexing method), and notifies the control channel generation part 56 and the data channel generation part 58 of the format allocation information.

In the base station 1, the up-link control channel format selected by the format selection/allocation part 10 is notified of to the up-link control channel demodulation part 18 therefrom. The control channel demodulation part 18 demodulates the control channel, based on the up-link control channel format, notified of from the format selection/allocation part 10. The control channel demodulation part 18 notifies the data channel demodulation part 19 of the up-link adaptive control parameters, demodulated from the control channel.

The data channel demodulation part 19 uses the adaptive control parameters notified of from the control channel demodulation part 18, and demodulates the data channels. Up-link CQI used for selecting the up-link control channel format is measured by the propagation path measurement part 17 of the base station 1.

It is noted that the measured up-link CQI is notified of to the format selection/allocation part 10 from the propagation path measurement part 17. Further, the up-link QoS, the down-link CQI and the transmission/reception function of the user terminal 2, transmitted by means of the up-link control channel from the user terminal 2 to the base station 1, are transmitted to the format selection/allocation part 10.

Next, the format selection/allocation part 10 of the base station 1 will now be described in further detail. FIG. 7 shows a configuration of one embodiment of the format selection/allocation part. The format selection/allocation part 10 is configured to include a down-link control channel resource allocation part 100, a down-link data channel resource allocation part 101, an up-link control channel resource allocation part 102 and an up-link data channel resource allocation part 103.

A processing procedure of the format selection/allocation part 10 of FIG. 7 will now be described with reference to FIG. 8 which shows a flow chart. FIG. 8 shows the flow chart of one example of the processing procedure of the format selection/allocation part.

In Step S1, the down-link control channel resource allocation part 100 and the up-link control channel resource allocation part 102 allocate radio resources to the control channels of the respective user terminals 2 according to the number of simultaneously multiplexing users and the trans-mission//reception functions of the user terminals 2.

In Step S2, the down-link control channel resource allocation part 100 and the up-link control channel resource allocation part 102 adjust the radio resources to be allocated to the control channels of the respective user terminals 2 according to CQI (reception quality, propagation path variation).

In Step S3, the down-link control channel resource allocation part 100 and the up-link control channel resource allocation part 102 adjust the radio resources to be allocated to the control channels of the respective user terminals 2 according to QoS (transmission rates, required delays).

In Step S4, the down-link control channel resource allocation part 100 and the up-link control channel resource allocation part 102 determine whether or not data channel radio resources are sufficient. When they determine that the data channel radio resources are sufficient (Yes of S4), Step S5 is then proceeded with.

In Step S5, the down-link data channel resource allocation part 101 and the up-link data channel resource allocation part 103 allocate radio resources to data channels of the respective user terminals 2 according to CQI and QoS.

When such determination is made that the data channel radio resources are not sufficient (No in S4), Step S1 is then returned to. That is, until it is determined in Step S4 that the data channel radio resources are sufficient, the processing of Steps S1 through S4 is repeated.

From the processing procedure of FIG. 8, the above-described format allocation information can be created, and thus, the format allocation information can be notified of to the signaling generation part 11, the control channel generation part 12, the data channel generation part 13 and the up-link control channel demodulation part 18.

Next, the format allocation part 57 of the user terminal 2 will now be described in further detail. FIG. 9 shows a configuration of one embodiment of the format allocation part. The format allocation part 57 is configured to include an up-link control channel resource allocation part 151 and an up-link data channel resource allocation part 152.

Based on the up-link control channel format notified of from the signaling demodulation part 53, the up-link control channel resource allocation part 151 allocates radio resources to the up-link control channel of the respective user terminal 2. Based on the up-link adaptive control parameters notified of from the signaling demodulation part 53, the up-link data channel resource allocation part 152 allocates radio resources to the data channels of the respective user terminal 2.

Thus, the format allocation part 57 can create the above-described format allocation information, and thus, can notify the up-link control channel generation part 56 and the up-link data channel generation part 58 of the format allocation information.

Thus, according to the present invention, since the number of bits of the control channel can be limited when the number of simultaneously multiplexing users increases, data channel transmission efficiency can be improved. Further, since a larger benefit of adaptive radio link control can be obtained as a result of the control channel format to use being selected according to the transmission/reception function of the user terminals 2 and/or the propagation path quality, total throughput can be improved. Further, since degradation in data channel transmission efficiency can be controlled, and the number of simultaneously multiplexing users can be increased, channel allocation can be carried out more flexibly.

While the invention herein disclosed has been described by means of specific embodiments and applications thereof, numerous modifications and variations could be made thereto by those skilled in the art without departing from the scope of the invention set forth in the claims.

What is claimed is:

1. A control channel transmitting method, comprising:
   selecting one control channel format from among a plurality of control channel formats having different numbers of control points, each control channel format including modulation scheme information, according to whether to carry out multiple input multiple output transmission; and
   transmitting a control channel with the use of the selected control channel format,
   wherein a number of bits indicating a modulation scheme included in a control channel format to be selected when the multiple input multiple output transmission is carried out is greater than that include in a control channel format to be selected when the multiple input multiple output transmission is not carried out.

2. The control channel transmitting method as claimed in claim 1, wherein:
   the control channel is transmitted, wherein the control channel is multiplexed in a time domain.

3. The control channel transmitting method as claimed in claim 1, wherein:

the control channel is transmitted, wherein the control channel is multiplexed in a frequency domain.

4. The control channel transmitting method as claimed in claim 1, wherein:
the control channel is transmitted, wherein the control channel is multiplexed in a code domain.

5. A base station comprising:
a selecting part configured to select one control channel format from among a plurality of control channel formats having different numbers of control points, each control channel format including modulation scheme information, according to whether to carry out multiple input multiple output transmission; and
a transmitting part configured to transmit a control channel to a terminal with the use of the selected control channel format,
wherein a number of bits indicating a modulation scheme included in a control channel format to be selected when the multiple input multiple output transmission is carried out is greater than that include in a control channel format to be selected when the multiple input multiple output transmission is not carried out.

6. A terminal comprising:
a control channel demodulating part configured to have a control channel format notified from a base station which transmits a control channel with the use of the control channel format which is selected from among a plurality of control channel formats having different numbers of control points, each control channel format including modulation scheme information, according to whether to carry out multiple input multiple output transmission, and demodulate the control channel received from the base station with the use of the notified control channel format; and
a data channel demodulating part configured to demodulate a data channel received from the base station with the use of a result of the demodulation of the control channel carried out by the control channel demodulating part,
wherein a number of bits indicating a modulation scheme included in a control channel format to be selected when the multiple input multiple output transmission is carried out is greater than that include in a control channel format to be selected when the multiple input multiple output transmission is not carried out.

7. A terminal comprising:
a transmitting part configured to have a control channel format notified from a base station, selected from among a plurality of control channel formats having different number of types of control points, each control channel format including modulation scheme information, according to whether to carry out multiple input multiple output transmission, and transmit a control channel to the base station with the use of the notified control channel format,
wherein a number of bits indicating a modulation scheme included in a control channel format to be selected when the multiple input multiple output transmission is carried out is greater than that include in a control channel format to be selected when the multiple input multiple output transmission is not carried out.

8. A control channel transmitting method, comprising:
selecting one control channel format from among a plurality of control channel formats having different numbers of bits of modulation scheme information in the control channel formats, according to whether to carry out multiple input multiple output transmission; and
transmitting a control channel with the use of the selected control channel format,
wherein a number of bits indicating a modulation scheme included in a control channel format to be selected when the multiple input multiple output transmission is carried out is greater than that include in a control channel format to be selected when the multiple input multiple output transmission is not carried out.

9. A base station, comprising:
a selecting part configured to select one control channel format from among a plurality of control channel formats having different numbers of bits of modulation scheme information in the control channel formats, according to whether to carry out multiple input multiple output transmission; and
a transmitting part configured to transmit a control channel to a terminal with the use of the selected control channel format,
wherein a number of bits indicating a modulation scheme included in a control channel format to be selected when the multiple input multiple output transmission is carried out is greater than that include in a control channel format to be selected when the multiple input multiple output transmission is not carried out.

10. A terminal comprising:
a control channel demodulating part configured to have a control channel format notified from a base station which transmits a control channel with the use of the control channel format which is selected from among a plurality of control channel formats having different numbers of bits of modulation scheme information in the control channel formats according to whether to carry out multiple input multiple output transmission, and demodulate the control channel received from the base station with the use of the notified control channel format; and
a data channel demodulating part configured to demodulate a data channel received from the base station with the user of a result of the demodulation of the control channel carried out by the control channel demodulating part,
wherein a number of bits indicating a modulation scheme included in a control channel format to be selected when the multiple input multiple output transmission is carried out is greater than that include in a control channel format to be selected when the multiple input multiple output transmission is not carried out.

* * * * *